(No Model.)

D. H. BRANNEN.
MEAT BLOCK AND CHOPPING BOWL.

No. 564,913. Patented July 28, 1896.

WITNESSES
Jos. A. Ryan
Amos W. Hart

INVENTOR
David H. Brannen
By
Munn & Co.
ATTORNEYS.

UNITED STATES PATENT OFFICE.

DAVID H. BRANNEN, OF FORT SCOTT, KANSAS.

MEAT-BLOCK AND CHOPPING-BOWL.

SPECIFICATION forming part of Letters Patent No. 564,913, dated July 28, 1896.

Application filed October 16, 1895. Serial No. 565,830. (No model.)

*To all whom it may concern:*

Be it known that I, DAVID H. BRANNEN, of Fort Scott, in the county of Bourbon and State of Kansas, have invented a new and Improved Meat-Block and Chopping-Bowl, of which the following is a specification.

It is the object of my invention to provide for domestic use a device which is adapted to serve in several capacities, namely, chiefly as a meat or chopping block proper and a chopping-bowl, also, as a bread-board, dough-raiser, &c.

The construction and arrangement of parts are as hereinafter described, reference being had to the accompanying drawings, in which—

Figure 1:
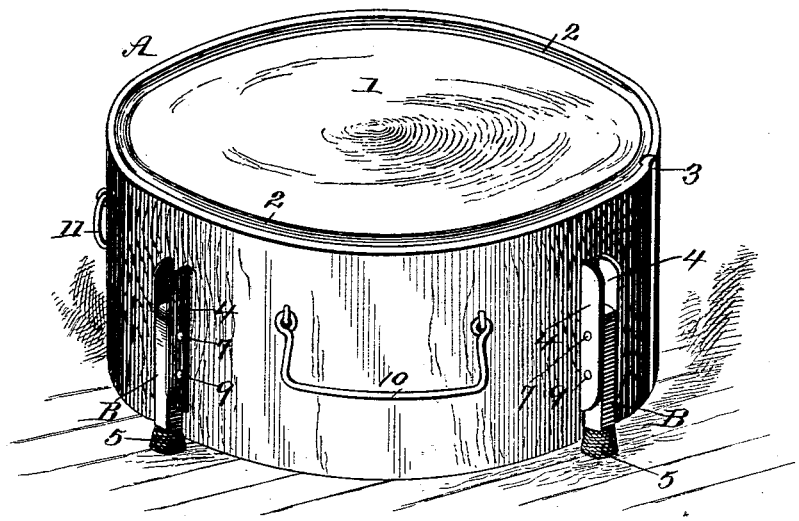
Figure 2:
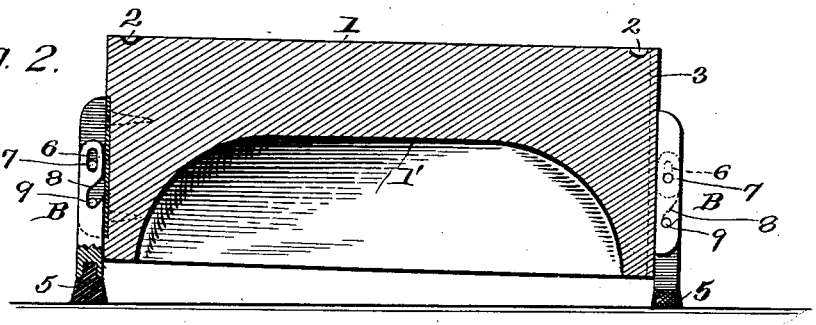
Figure 3:
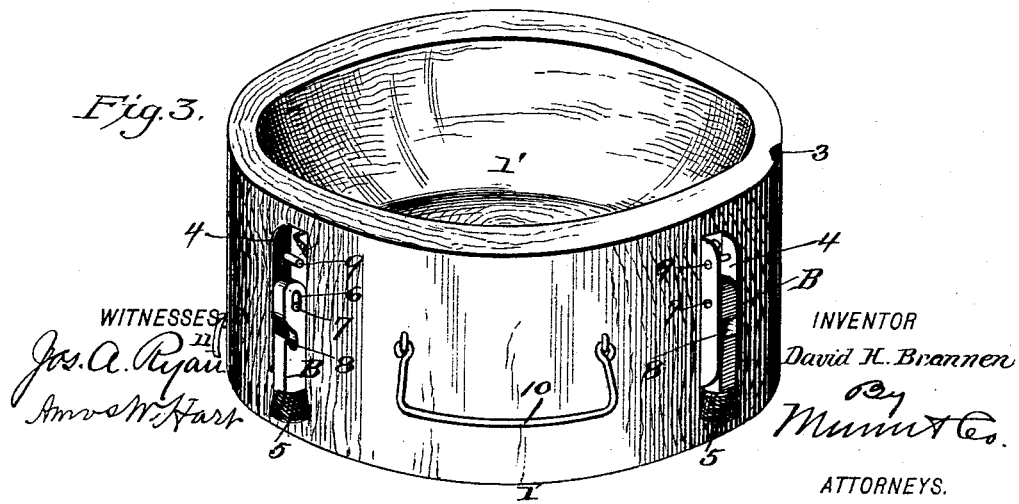

Figure 1 is a perspective view of my combined meat-block and chopping-bowl. Fig. 2 is a vertical section of the same. Fig. 3 is a perspective view showing the block reversed, as when used as a chopping-bowl.

The wooden block A is circular and provided on its vertical side with legs B, which are so constructed and attached as to be reversible in position. The top or upper surface 1 of the block is shown flat, but may be slightly conical and also provided with a circular groove 2 near its edge, which leads to a groove 3, formed in the side of the block. The blood or other fluid from meat being cut up on the block flows from the central part to the surrounding groove 2, and thence down the side groove 3 into a drip-pan or other receptacle, (not shown,) which is in practice provided for the purpose.

The legs B on one side of the block A are somewhat shorter than those on the opposite side, so that when the block is supported by the legs its top is inclined slightly, as shown in Fig. 2, and the blood or other fluid from the meat is enabled to flow more easily to the escape-groove 3.

In order to prevent a jar or noise when meats are chopped or pounded on the block, the legs B are provided with elastic blocks 5, which constitute cushioned feet. The latter also prevent the table or floor being marred or scratched.

The under side 1' of the block A is deeply recessed or concaved, so that when turned over, as shown in Fig. 3, it is adapted to serve as a chopping-bowl, also as a dough-receptacle, dough-raiser, and receptacle for ice.

The legs B are preferably made of malleable iron and pivoted between parallel vertical flanges 4, fixed on the side of the block, and, when adjusted as shown in Figs. 1 and 2, they project below the block and support it upon the table or floor.

The legs have closed slots 6 in their upper ends, and are pivoted by a transverse bolt 7, that connects the middle portions of adjacent flanges 4. At a point below such slot 6 the legs are provided with open slots or notches 8, that incline upward or toward the aforesaid closed slot 7, and are adapted to receive and engage a cross-bolt 9, that connects the flanges 4 at a point below their middle.

It will be perceived that when the legs B are adjusted, as shown in Figs. 1 and 2, to support the block and bowl the cross-bolts 7 and 9 constitute the points of bearing and the legs are held firmly in vertical position, chiefly by reason of the inclination of the notches or open slots 8, which tend to draw the legs inward against the side of the block. Also, when it is desired to use the block as a chopping-bowl, Fig. 3, the legs are pulled down to disengage them from the bolt 9, and then turned or reversed, and will be held in such reversed position by the slots 6 and bolts 7.

I provide the block and bowl with hinged bail-like handles 10, that are useful in lifting and carrying the same, and with a ring 11 for hanging it upon a nail against the wall.

The concavity 1' of the block adapts it for use in holding bread-dough, and it may be heated in advance in order to promote fermentation and consequent rising of the dough. The block also serves as a stand or table for supporting a dish-pan or other heavy articles. One of its chief uses, however, is as a chopping-bowl for ice to be chopped.

What I claim is—

1. The device, composed of a block, which is flat on one side and concave on the other, for use as specified, and supporting-legs which are pivoted nearer one edge of the block than the other, and thus adapted to be reversed so that they project below the block when in one position, but not in the other, and means for securing the legs in both positions, as shown and described.

2. The combination, with the meat-block, having parallel vertical flanges secured to its side, and provided with cross-bolts, of legs having a closed slot and a lateral inclined notch or open slot, which slots receive said bolts and enable the legs to be held against the side of the block, and reversed, as shown and described.

DAVID H. BRANNEN.

Witnesses:
W. R. BIDDLE,
C. C. CRAM.